United States Patent [19]

Yuan et al.

[11] Patent Number: 4,942,538
[45] Date of Patent: Jul. 17, 1990

[54] TELEROBOTIC TRACKER

[75] Inventors: Joseph S. Yuan, Toronto; Richard A. MacDonald, West Hill; Felix H. N. Keung, Willowdale, all of Canada

[73] Assignee: Spar Aerospace Limited, Mississauga, Canada

[21] Appl. No.: 315,260

[22] Filed: Feb. 23, 1989

Related U.S. Application Data

[63] Continuation of Ser. No. 232,546, Aug. 15, 1988, abandoned, which is a continuation of Ser. No. 927,875, Nov. 7, 1986, abandoned.

[51] Int. Cl.[5] .............................................. G06F 15/00
[52] U.S. Cl. ..................................... 364/513; 364/559; 358/101
[58] Field of Search ................. 364/513, 559; 356/375, 356/376, 12, 13; 358/96, 101, 88–90, 93, 107; 382/28, 46, 48, 14–19; 901/47

[56] References Cited

U.S. PATENT DOCUMENTS

| | | | |
|---|---|---|---|
| 4,105,925 | 8/1978 | Rossol et al. | 250/561 |
| 4,396,945 | 8/1983 | DiMatteo et al. | 358/107 |
| 4,539,703 | 8/1985 | Clearman | 364/513 |
| 4,550,432 | 10/1985 | Andersson | 382/1 |
| 4,611,292 | 9/1986 | Ninomiya et al. | 364/550 |
| 4,613,942 | 9/1986 | Chen | 364/513 |
| 4,639,878 | 1/1987 | Day et al. | 364/513 |
| 4,675,502 | 6/1987 | Haefner et al. | 318/574 |

Primary Examiner—Allen MacDonald
Attorney, Agent, or Firm—Fetherstonhaugh & Co.

[57] ABSTRACT

A telerobotic system adapted for tracking and handling a moving object comprises a robot manipulator, a video monitor, an image processor, hand controls and a computer. The robot manipulator comprises a movable robotic arm having an effector for handling an object, a drive system for moving the arm in response to arm input signals, sensors for sensing the position of the arm and for generating arm output signals which characterize the dynamic motion behavior of the arm, and a video camera carried by the arm. The camera responds to motion of the moving object within the field of view of the camera. The video monitor receives an input video signal from the video camera, for displaying an image of the object to a human operator. The image processor is responsive to the output signal of the camera, and is capable of acquiring and pre-processing an image of the object on a frame by frame basis. The hand control is capable of generating a hand control output signal in response to input from a human operator. The computer generates arm input signals and is disposed between the hand control means, the robot manipulator, and image processor. The computer receives (i) output signals from the image processor and (ii) the arm output signals and (iii) the hand control output signal and generates arm input signals in response to the received signals whereby the arm tracks the motion of the object.

10 Claims, 8 Drawing Sheets

RESOLVED RATE CONTROL OF TARGET POSITION

RESOLVED RATE CONTROL OF TARGET ORIENTATION

ROBOT BLOCK DIAGRAM

IMAGE PROCESSOR BLOCK DIAGRAM

TELEROBOTIC TRACKER

This application is a continuation, of application Ser. No. 07/232,546, filed 08/15/88 now abandoned which is a continuation of Ser. No. 06/927,875 filed 11/7/86 now abandoned.

This invention relates to a tracking system for tracking one position and orientation of moving objects. In particular, this invention relates to a telerobotic tracking system for use in the tracking and handling of moving objects.

PRIOR ART

For many years now, teleoperation using manipulators has been a standard practice in the remote handling of objects in hostile environments. One of the most prominent examples is the space shuttle's remote manipulator system (SRMS) which allows an operator to retrieve free-flying payloads from a control station located in the aft flight deck of the shuttle.

A fundamental requirement for using the SRMS is that the payload must be sufficiently stabilized in its motion relative to the shuttle before it can be grappled by the end effector. Indeed, this has been demonstrated rather dramatically during the missions involving Solarmax and TDRSS.

Up to now, most of the payloads retrieved by the SRMS have been more or less stationary relative to the base of the manipulator. Hence, the task has been accomplished without much difficulty in most cases.

Unfortunately, this mode of teleoperation can present severe difficulties when the payload is in motion and when the operator must perform the usual manipulation tasks and track the motion of the target at the same time. Without a certain degree of automation, the workload imposed on the operator could render such a task completely intractable.

Our telerobotic tracker employs a manipulator equipped with a camera mounted on its end effector, and can autonomously track the motion of the target. The basic concept is that, in the absence of any operator command, the camera image of the target as seen by an operator remains stationary. Working from the video image of the apparently stationary target, the operator can then perform the usual remote manipulation tasks without having to compensate for the motion of the payload.

Apart from uses in space, the tracking robot also has commercial potential in terrestrial environments. These applications range from the retrieval of hovering aircraft from a ship deck to the online inspection of workpieces on a moving conveyor.

Prior to this, a system for detecting target range and orientation has been developed independently by the National Research Council of Canada (NRCC). This system has been disclosed as follows:

[1] H. F. L. Pinkney, C. I. Perratt, V. Kratky, and A. A. Ayad, "On the application of automatic, real-time single camera photogrammetry to derive the relative spatial orientation and position of objects in machine tasks: A conceptual outline and preliminary evaluation", NRCC/NAE Laboratory Technical Report, LTR-ST-1007, August 1981.

[2] H. F. L. Pinkney, "Theory and development of an on-line 30 Hz video photogrammetry system for real-time three-dimensional control", ISP Symposium on Photogrammetry for Industry, Stockholm, August 1978.

[3] V. Kratky, "Analytical study of a photogrammetric solution for real-time three-dimensional control", ISP Symposium on Photogrammetry for Industry, Stockholm, August 1978.

[4] R. C. Hughes, "Enhanced single camera photogrammetry algorithms for real-time control applications," International Society for Photogrammetry and Remote Sensing, Commission V Symposium, Ottawa, June 1986.

However, in contrast to our telerobot, the NRCC system, as described in [1]-[4] above, is designed only for determining target range and orientation and does not make explicit allowance for either autonomous target tracking or man-in-the-loop teleoperation.

The NRCC method is based on a photogrammetry solution of the classical collinearity equations as described in, e.g.,

[5] Wolf, R. P., Elements of Photogrammetry, McGraw-Hill Inc., 1974.

The algorithm is iterative from sample to sample, i.e., the data for each iteration in the alogrithm are taken from successively sampled image frames. However, the algorithm does not necessarily produce the correct photogrammetric solution at each sampling interval and to prove the convergence of the algorithm is by no means an easy task.

In contrast, the photogrammetric solution adopted in our telerobotic system is novel insofar as it is based entirely on linear algebraic techniques and makes no explicit use of the classical collinearity equations. The algorithm is also iterative, but the iteration cycle is carried to convergence within each sampling interval so that the correct photogrammetric solution is generated for each data sample.

In order to speed up the computation, the NRCC solution has been tailored to fit only certain specific target configurations, such as a square point array or a symmetric three-point pattern. Unfortunately, this also means that a predesigned point array pattern must first be installed onto each target.

The solution used in our telerobot is completely general in the sense that it is not constrained by the choice of the feature points on the target. As a result, there is no need to install specially-designed point patterns onto the target.

SUMMARY OF INVENTION

In our telerobot concept, the manipulator, equipped with an end-effector-mounted camera, automatically tracks the motion of the target so that, in the absence of any operator command, the camera image of the latter remains stationary. This then allows the operator to perform remote manipulation tasks on the target without having to compensate for payload.

This telerobot concept has been demonstrated in a laboratory environment with a prototype system consisting of commercially-available equipment and specially-designed software.

With the aid of specially-designed control software, our system can autonomously track the motion of a moving object while allowing man-in-the loop teleoperation. The tracking system monitors the target's position and orientation using the image data collected from a single wrist-mounted camera. A fast-converging iterative photogrammetry algorithm together with a proportional feedback controller maintain real-time tracking of the object in all six degrees-of freedom. The prototype uses an image processor, a 32-bit minicomputer, an industrial robot and a video camera, all of which are commercially available. The tracking/control system in the demonstration can operate at a sampling frequency of between 20 and 40 Hz.

According to one aspect of the present invention there is provided a telerobotic system adapted for handling a moving object, said object having at least three feature points of known position, comprising:

(a) a robot manipulator comprising
(i) a movable robotic arm,
(ii) means for moving said arm in response to arm input signals,
(iii) means for sensing the position of said arm and for generating arm output signals, which arm output signals characterize the dynamic motion behaviour of said arm, and
(iv) a video camera carried by said arm, said camera being adapted to respond to motion of said moving object within the field of view of said camera;
(b) video monitor which receives an input video signal from said video camera, for displaying an image to a human operator;
(c) image processing means, responsive to the output signal of said camera, capable of acquiring and preprocessing an image on a frame by frame basis;
(d) hand control means capable of generating a hand control output signal in response to input from a human operator;
(e) computer means disposed between said hand control means, said robot manipulator, and said image processing means, said computer means receiving (i) the output signal from said image processing means, (ii) the output signal from said hand control means, and (iii) said arm output signals and generating arm input signals in response to said input signals to said computer means for tracking the target.

The invention will be more clearly understood after reference to the following detailed specification read in conjunction with the drawings wherein FIG. 1 is a block diagram illustrating the control system configuration, FIG. 2 is a block diagram illustrating the resolved rate control of target position, FIG. 3 is a block diagram illustrating the resolved rate control of target orientation, FIG. 4 is a diagrammatic illustration of a target tracking system suitable for use in demonstrating the present invention, FIG. 5 is a block diagram illustrating the robot servo systems, FIG. 6 is a block diagram of the computer system, FIG. 7 is a block diagram of the image processor, FIG. 8 is a pictorial view of a target suitable for use in demonstrating the present invention, FIG. 9 is a software block diagram, FIG. 10 is a diagram which illustrates the relationship between the camera, target and image plane, and FIG. 11 is a diagramatic representation of the robot illustrating the various position vectors.

With reference to FIGS. 1 and 4 of the drawings, the reference numeral 10 refers generally to the robot manipulator, the reference numeral 12 refers generally to the computer, the reference numeral 14 refers to the image processor, the reference numeral 16 refers generally to the video monitor and the numeral 18 refers generally to the hand controller. The movable target is generally identified by the reference numeral 20.

OVERVIEW OF THE SYSTEM

FIG. 1 contains a schematic description of the tracking and handling system, or tracking system. Refer also to FIG. 4, which portrays a perspective view of the equipment from which the system may be assembled.

As can be seen, the system includes the following subsystems:
A. Robot manipulator 10.
B. Image processor 14.
C. Computer 12.
D. Video Monitor 16.
E. Hand controller 18.
The target 20 is to be tracked, or, tracked and handled by the system.

A general description of the functions of the various elements in the system now follows.

The robot manipulator 10 includes robot arm 30, joint servos 32, joint sensors 34 and camera 36. The arm 30 moves in accordance with the input signals to the joint servos 32, while the output signals from the joint sensors 34 denote the positions of the individual joints in the arm 30 in relation to each other. The overall joint actuation and sensing process for a typical robot is illustrated in FIG. 5.

The outputs from the joint sensors 34 can be translated via kinematic transformation to relate the position and orientation of the end-effector 31 (i.e., the last link in the arm 30) to the base of the manipulator 10.

The camera 36 is mounted on the end-effector 31 of the arm 30. The image processor 14 acquires the video signal from the camera 36 and preprocesses the images on a frame by frame basis. The outputs of the image processor 14 comprise the instantaneous locations and rates of motion of selected feature points on the target 20 as observed on the image plane of the camera 36.

The camera 36 also outputs signals directly to the video monitor 16 thus providing the operator with an instantaneous view of the target 20 as seen from the end-effector of the arm 30.

The hand controller 18 allows a human operator to command the motion of the target 20 relative to the end-effector of the arm 30 based on the visual information of the target as perceived on the video monitor 16.

The computer 12 accepts the outputs from the hand controller 18, the image processor 14 and the joint sensors 34 from the robot manipulator 10, and computes the command signals required to drive the joint servos 32. The computer contains software to perform the following control functions:
(a) Kinematic transformation,
(b) Photogrammetry,
(c) Target motion estimation, and
(d) Tracking control.

The detailed algorithms for control functions (b), (c) and (d) will be presented hereinafter. A general description of these functions now follows.

(a) Kinematic Transformation

The mathematical relationships between the position, orientation and velocities of the end-effector of a robot manipulator and the positions and rates of its joints are described by a set of algebraic transformations. These kinematic transformations are derivable for most robot manipulators using standard techniques in robotics and are therefore considered to be well-known to those skilled in the art. Hence, these will not be described here.

(b) Photogrammetry

The objective of the photogrammetry algorithm is to estimate the position and orientation (as well as the linear and angular velocities) of the target with respect to the camera. For this a general solution has been developed which yields the photogrammetry information based on a two-dimensional image of the target recorded by the robot-mounted camera.

In the photogrammetry solution, each target is configured by a number of feature (or, control) points whose locations on the target are known a priori. In general, for a numerically robust algorithm, no more than 5 control points are needed; 3 or 4 points will typically suffice. Furthermore, the solution is almost always unique in the case of 4 coplanar control points. Our solution however, is completely general in the sense that it is applicable to any control-point configuration. Any identifiable feature on the target may be used as a control point provided its location on the target is known a priori. In principle any salient features of an object could be used.

(c) Target Motion Estimation

The photogrammetry solution yields the motion (i.e., position, orientation and rates) of the target relative to the camera. The motion of the camera relative to the base of the robot, on the other hand, is described by the kinematic transformtion algorithm. Thus, it is now possible to estimate the motion of the target relative to the base of the robot. This information will be needed in the subsequent control algorithms.

(d) Tracking Control

The idea of the so-called robotically assisted teleoperation concept is to allow the operator to issue commands from a rate-type hand controller based on the camera image of the target (FIG. 1). The hand controller inputs therefore consist of commands for target velocities relative to the camera reference frame. Based on the estimated motion of the target, the control algorithm then generates the appropriate commands for the joint servos in the robot.

The resolved rate control algorithms for position and orientation are depicted in FIGS. 2 and 3, respectively. Within the control algorithm, standard proportional feedback is used. Orientation control is accomplished here with quaternion feedback which represents a novel approach in robotic control. This concept has been in use for some time in spacecraft attitude control problems, see, e.g.,

[6] Mortensen, R. E., "A Globally Stable Linear Attitude Regulator", Int. J. Control, Vol. 8, No. 3, 1968, pp. 297–302.

[7] Ickes, B. P., "A New Method for Performing Digital Control System Attitude Compensation Using Quaternions", AIAA Journal, Vol. 8, No. 1, January 1970, pp. 13–17.

[8] Wie, B. and Barba, P. M., "Quaternion Feedback for Spacecraft Large Angle Maneuvers", AIAA Journal of Guidance, Control and Dynamics, Vol. 8, No. 3, May–June 1985, pp. 360–365.

A discussion of the mathematics of (1) the photogrammetry algorithm, (2) target motion estimator and (3) tracking control algorithm is next presented.

DETAILED DESCRIPTION OF THE COMPUTER ALGORITHMS

The algorithms for (A) photogrammetry, (B) target motion estimation and (C) resolved rate control are presented below.

(A) PHOTOGRAMMETRY ALGORITHMS

Notation

Figure 10:
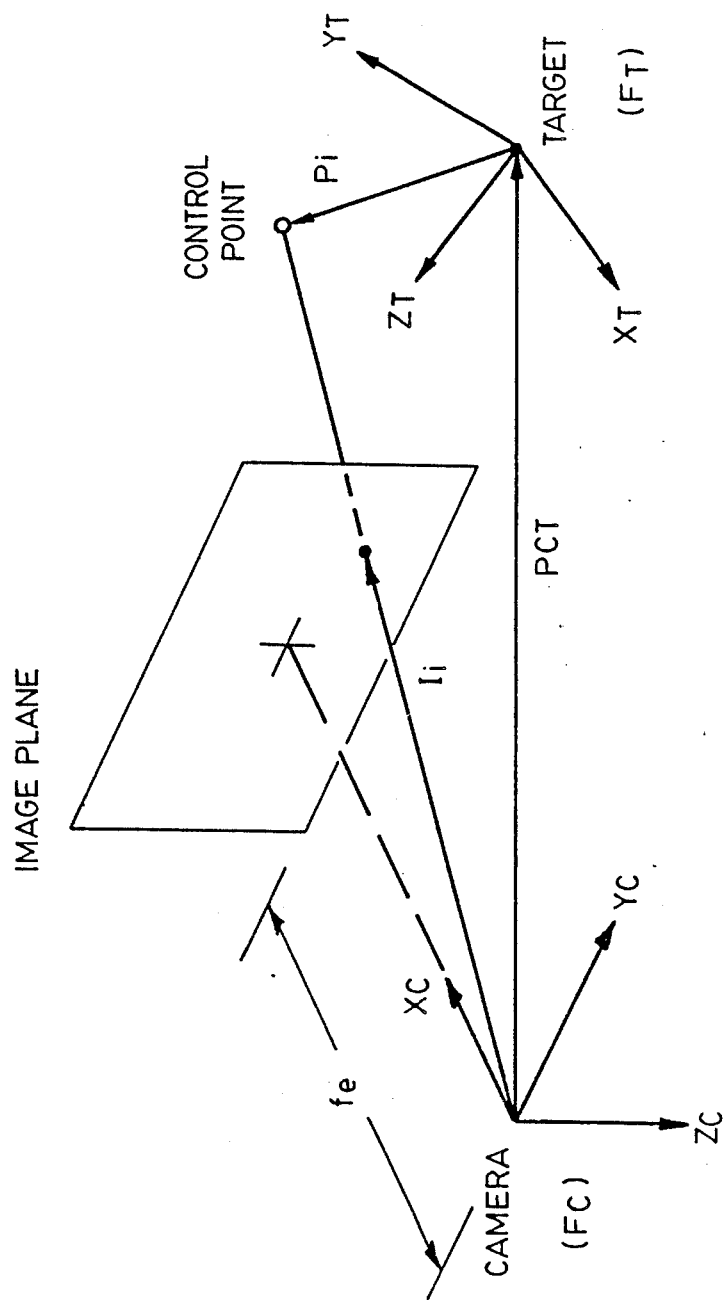

For the purpose of photogrammetric analysis, the camera optics can be represented by a projection centre located at a distance of $f_e$ (the effective focal length) behind the image plane as shown in FIG. 10. The two reference frames of interest here are: $F_C$ fixed at the projection centre of the camera, and $F_T$ fixed in the target object, each reference frame being represented by a unit vector triad—$(x_C, y_C, z_C)$ for $F_C$ and $(x_T, y_T, z_T)$ for $F_T$. The $x_C$-axis is taken to be the optical axis of the camera.

Let the position of each image point be denoted by the vector $I_i$ whose coordinates in $F_C$ are expressed as $$I_i = [f_e \ Y_i \ z_i]^T \qquad (2.1)$$

Here $y_i$ and $z_i$ are the coordinates of the image point measured on the image plane of the camera. (Throughout this specification, a superscript "T" denotes the transpose of a vector or matrix.)

The target reference frame $F_T$ may be arbitrarily chosen provided the position of each control point ($p_i$) in this frame is known. Denote the position of the target by the vector $p_{CT}$ directed from the origin of $F_C$ to the base of $F_T$.

In this specification we shall represent the target's orientation by the rotation matrix $B_{CT}$ which has the property that for any vector whose coordinates are expressed as x in $F_C$ and y in $F_T$, we have $$\bar{x} = B_{CT} y$$

This representation is unique in the sense that there is a one-to-one correspondence between orientation and the numerical values of the elements in $B_{CT}$. However, the elements in $B_{CT}$ are not all independent since its rows (and columns) must form an orthonormal set. Indeed, it can easily be seen that the columns in $B_{CT}$ are in fact the coordinates of the unit vectors ($x_T, y_T, z_T$) measured in $F_C$. Likewise, the rows of $B_{CT}$ represent the triad ($x_C, y_C, z_C$) in $F_T$-coordinates.

The photogrammetry problem can now be posed formally as follows.

Given:

$f_e$, effective focal length of the camera, $p_i$, i=1 ... n, the coordinates of n control points in $F_T$, and $I_i$, i=1 ... n, the coordinates of n image points in $F_C$.

Find:

$p_{CT}$, position of $F_T$ in $F_C$-coordinates, and $B_{CT}$, the orientation matrix of $F_T$ in $F_C$.

Photogrammetry Algorithm for position and orientation

From the geometry depicted in FIG. 10, the position of each of the n control points can be expressed in $F_C$-coordinates as $$\beta_i I_i = p_{CT} + B_{CT} p_i \ (i=1 \ldots n) \qquad (3.1)$$

where $\beta_i$ are positive scalars. The classical collinearity equations are obtained by taking the ratio of each of the last two equations of (3.1) to the first one ($y_i/f_e$ and $z_i/f_e$). This eliminates the unknowns $\beta_i$ from (3.1) but leaves the equations in a form from which little can be said about the structure of a general solution.

If, instead of elimination $\beta_i$, we remove $p_{CT}$ from (3.1) by subtracting, say, the $n^{th}$ equation from the rest, we get $$\beta_i I_i - \beta_n I_n = B_{CT}(p_i - p_n), \quad (i=1 \ldots n-1) \tag{3.2}$$

Assuming these equations can be solved for the unknowns $\beta_i$ and $B_{CT}$, we can easily recover $p_{CT}$ from the following averaging process $$PCT = (1/n) \sum_{i=1}^{n} (\beta_i I_i - B_{CT} p_i) \tag{3.3}$$

Henceforth, we shall direct our attention only to the solution of (3.2).

Define the unknowns in Eq. (3.2) by the vectors $$\beta := [\beta_1 \ldots \beta_n]^T$$
$$a := [a_1^T a_2^T a_3^T] \tag{3.4}$$

where $a_i$ ($i=1 \ldots 3$) represent the rows in the orientation matrix:

$$B_{CT} := \begin{bmatrix} a_1^T \\ a_2^T \\ a_3^T \end{bmatrix} \tag{3.5}$$

(Here and below, the symbol ":=" denotes a definition.) Equation (3.2) can thus be written in the form $$\begin{bmatrix} R_x & P & 0 & 0 \\ R_y & 0 & P & 0 \\ R_z & 0 & 0 & P \end{bmatrix} \begin{bmatrix} \beta \\ a \end{bmatrix} = 0 \tag{3.6}$$

where $R_x$, $R_y$ and $R_z$ each has a dimension of $(n-1) \times n$, and $P$ is an $n-1 \times 3$ matrix. These matrices are defined as follows:

$$R_x := \begin{bmatrix} f_e & & & & -f_e \\ & \cdot & & & 0 \\ & & f_e & & -f_e \\ & 0 & & \cdot & \\ & & & & f_e & -f_e \end{bmatrix}; \tag{3.7a}$$

$$R_y := \begin{bmatrix} y_1 & & & & -y_n \\ & \cdot & & & 0 \\ & & y_2 & & -y_n \\ & 0 & & \cdot & \\ & & & & y_{n-1} & -y_n \end{bmatrix} \tag{3.7b}$$

$$R_z := \begin{bmatrix} z_1 & & & & -z_n \\ & \cdot & & & 0 \\ & & z_2 & & -z_n \\ & 0 & & \cdot & \\ & & & & z_{n-1} & -z_n \end{bmatrix} \tag{3.7c}$$

$$P := \begin{bmatrix} -(p_1 - p_n)^T \\ \cdot \\ \cdot \\ -(p_{n-1} - p_n)^T \end{bmatrix}, \tag{3.7d}$$

where $y_i$ and $z_i$ are taken directly from the coordinates of the image vectors $I_i$ defined in (2.1), and $p_i$ are the control point coordinates.

Note that each row in P represents a vector directed at the $n^{th}$ control point from one of the remaining points. Thus, these vectors span a linear subspace occupied by the control points with a dimension given by the rank of P (i.e., the number of linearly independent rows in P). For instance, when the control points all lie in a straight line, P clearly has a rank of one. In the case of coplanar points, there are no more than two linearly independent row vectors in P. In general, for a random distribution of four or more control points, P will attain a maximal rank of three.

Through Gaussian elimination (see, e.g., Noble, B., Applied Linear Algebra, Prentice-Hall, 1969), we can find a nonsingular matrix E such that $$EP = \begin{bmatrix} P_1 \\ 0 \end{bmatrix} \tag{3.8}$$

where $P_1$ consists of r linearly independent rows, r being the rank of P. Premultiplying each of $R_x$, $R_y$ and $R_z$ by E, we get $$ER_x = \begin{bmatrix} R_{x1} \\ R_{x2} \end{bmatrix}; \tag{3.9}$$

$$ER_y = \begin{bmatrix} R_{y1} \\ R_{y2} \end{bmatrix};$$

$$ER_z = \begin{bmatrix} R_{z1} \\ R_{z2} \end{bmatrix}$$

where the partitioning separates the first r rows of each matrix from the remaining (n-r-1) rows. Equation (3.6) can now be written as $$\begin{bmatrix} R_{x1} & P_1 & 0 & 0 \\ R_{y1} & 0 & P_1 & 0 \\ R_{z1} & 0 & 0 & P_1 \end{bmatrix} \begin{bmatrix} \beta \\ a \end{bmatrix}$$

$$:= [R_1 \; P_1]\begin{bmatrix} \beta \\ a \end{bmatrix} = 0 \quad (3.10a)$$

$$\begin{bmatrix} R_{x2} \\ R_{y2} \\ R_{z2} \end{bmatrix} \beta := [R_2]\beta = 0 \quad (3.10b)$$

The algebraic solution to the above equations is given by $$\begin{bmatrix} \beta \\ a \end{bmatrix} \epsilon Ker[R_1 \; P_1]; \; \beta \epsilon Ker[R_2] \quad (3.11)$$

where Ker [.] denotes the kernel (or, null space) of a matrix. (The kernel of a matrix B is the set of all linearly independent vectors x such at B x=0. The number of such vectors which are nonzero defines the dimension of the kernel. We say a kernel is nontrivial if it contains at least one nonzero element.)

Assuming the kernels in (3.11) to be nontrivial, we can write the solution to Eq. (3.10) as $$\beta = [Ker \; R_2 \; x_1] \quad (3.12a)$$

$$a = \begin{bmatrix} a_1 \\ a_2 \\ a_3 \end{bmatrix} = \begin{bmatrix} -P_1^+ R_{x1} & Ker\,P_1 & 0 & 0 \\ -P_1^+ R_{y1} & 0 & Ker\,P_1 & 0 \\ -P_1^+ R_{z1} & 0 & 0 & Ker\,P_1 \end{bmatrix} \begin{bmatrix} \beta \\ x_2 \end{bmatrix} \quad (3.12b)$$

where [.]+ denotes matrix pseudoinverse and $x_i$ (i=1, 2) are arbitrary vectors of appropriate dimensions. Since $P_1$ has full row rank, its pseudoinverse is given by $$P^+{}_1 = P^T{}_1 \, [P_1 \, P^T{}_1]^{-1}$$

where the matrix product $[P_1 \; P^T_1]$ is nonsingular. Equivalently, we can combine the two solutions of (3.12) into one and write $$a = \begin{bmatrix} -P_1^+ R_{X1} \; [Ker\,R_2] & Ker\,P_1 & 0 & 0 \\ -P_1^+ R_{Y1} \; [Ker\,R_2] & 0 & Ker\,P_1 & 0 \\ -P_1^+ R_{z1} \; [Ker\,R_2] & 0 & 0 & ker\,P_1 \end{bmatrix} \begin{bmatrix} x_1 \\ x_2 \end{bmatrix} \quad (3.13)$$

$$:= \begin{bmatrix} V_1 \\ V_2 \\ V_3 \end{bmatrix} x$$

The problem now is to solve Eq. (3.13) for x subject to the following additional constraints on the component vectors of a:

$$a_i^T a_j = \delta_{ij}; \; a_1 = a_2 \times a_3 \quad (3.14)$$

where $\delta_{ij}$ is equal to one when i=j and zero otherwise. The cross-product constraint is to enforce a "right-hand rule" rotation sequence for the unit vector triad. In principle, these constraints impose nine quadratic equations on x. In practice, however, it has been found that the orthonormality conditions in (3.14) alone are sufficient to resolve the target orientation in most cases.

The six orthonormality constraints of (3.14) can be formulated as $$\begin{bmatrix} x^T & V_1^T & V_1 & x & - & 1 \\ x^T & V_2^T & V_2 & x & - & 1 \\ x^T & V_3^T & V_3 & x & - & 1 \\ & x^T & V_1^T & V_2 & x & \\ & x^T & V_2^T & V_3 & x & \\ & x^T & V_3^T & V_1 & x & \end{bmatrix} := f(x) = 0 \quad (3.15)$$

Since all the functions in (3.15) are twice-differentiable in x, we may use, in principle, any appropriate gradient technique for its solution. Here we shall choose Newton's method (see, e.g., Luenberger, D. G., Optimization by Vector Space Methods, John Wiley and Sons, 1969) because it yields a very fast (in fact, guadratic) rate of convergence as the iteration approaches a solution.

To apply Newton's method, we first linearize Eq.(3.15) about the current iterative point $x_k$ as follows $$f(x_k + \delta x_k) \approx f(x_k) + \nabla f(x_k) \, \delta x_k \quad (3.16)$$

where $\delta x_k$ denotes an increment to $x_k$ and $\nabla f$ is the gradient matrix, or Jacobian, of f. The latter, in this case, is simply given by $$\nabla f(x) = \begin{bmatrix} 2\,x^T\,V_1^T\,V_1 \\ 2\,x^T\,V_2^T\,V_2 \\ 2\,x^T\,V_3^T\,V_3 \\ x^T\,(V_1^T\,V_2 + V_2^T\,V_1) \\ x^T\,(V_2^T\,V_3 + V_3^T\,V_2) \\ x^T\,(V_3^T\,V_1 + V_1^T\,V_3) \end{bmatrix} \quad (3.17)$$

The iterative point is then updated according to the following recursive expression $$x_{k+1} = x_k - [\nabla f(x_k)]^+ f(x_k) \quad (3.18)$$

The pseudoinverse in the solution is defined as follows:

$$[\nabla f^T \nabla f]^{-1} \, \nabla f^T, \; \dim (x) < 6 \quad (3.19a)$$

$$[\nabla f]^+ = [\nabla f]^{-1}, \; \dim (x) = 6 \quad (3.19b)$$

$$\nabla f^T [\nabla f \, \nabla f^T]^{-1}, \; \dim (x) > 6 \quad (3.19c)$$

provided the required matrix inversion exists. Here dim (.) denotes the dimension of a vector. Note that (3.19a) and (3.19c), when used with (3.18), in fact yield the least squares and the minimum-norm solutions, respectively, to the equation $f(x_k) + \nabla f(x_k) \delta x_k = 0$ The photogrammetry solution is now complete and can be summarized by the following algorithm:

STEP 1 Construct the matrix P in (3.7d) from the control point coordinates $p_i$, i=1 ... n. Then use Gaussian elimination to find the matrices E and $P_1$ defined in (3.8). Also, compute the pseudoinverse and kernel of $P_1$.

STEP 2 Construct the matrices $R_x$, $R_y$ and $R_z$ defined in (3.7a–c) from the image vector coordinates $I_i$, i=1 ... n.

Premultiply each of these matrices by E to yield the matrices $R_{xi}$, $R_{yi}$ and $R_{zi}$ (i=1, 2) defined in (3.9).

STEP 3 Find the kernel of $R_2$ which is defined in (3.10b).

STEP 4 Construct the matrices $V_i$, i=1 ... 3, defined in (3.13).

STEP 5 Select an initial estimate of the vector $x_k$ (k=0).

STEP 6 Evaluate the function f defined in (3.15) at the current iterative point $x_k$. If the norm is within a predefined threshold of zero, then go to Step 8.

STEP 7 Compute the Jacobian $\nabla f$ from (3.17). If the required matrix inversion in (3.19) fails due to singularity, then return to Step 6 with an arbitrarily perturbed iterative point. Otherwise, update $x_k$ according to (3.18) and return to Step 6.

STEP 8 Compute the vectors a and $\beta$ from (3.13) and (3.12a), respectively. Assemble $B_{CT}$ as in (3.5) and recover $p_{CT}$ from (3.3).

If at any iterative point the Jacobian is close to being singular, then perturbing the point by an arbitrary amount will almost certainly render the matrix nonsingular again. This explains the rationale behind the precaution taken in Step 7 of the algorithm.

Note that Step 1 needs to be processed only once for any given target and can therefore be done offline. Also, in the case of sequentially-sampled image data (e.g., when tracking a moving target), the above procedure must be carried to convergence over each image frame. In this case, the solution of each iteration cycle may be used as the starting point for the following cycle. This ensures the interative points will stay sufficiently close to the true solution to yield quadratic convergence.

Photogrammetry Algorithm for Velocities

Once the position and orientation of the target frame $F_T$ with respect to the camera frame $F_C$ are known, their relative velocities can be obtained as follows.

We start by differentiating (3-1) to yield:

$$\dot{\beta}_i I_i + \beta_i \dot{I}_i = \dot{p}_{CT} + w_{CT} \times A_{CT} p_i, \quad (i=1,\ldots,n) \qquad (4\text{-}1)$$

where $\dot{p}_{CT}$ and $w_{CT}$ are the linear and angular velocities, respectively, of $F_T$ relative to $F_C$. We assume the image velocity vectors are also available as:

$$\dot{I}_i = [0 \; \dot{y}_i \; \dot{z}_i]^T, \quad i=1\ldots n \qquad (4\text{-}2)$$

If we denote $$q_i := A_{CT} p_i, \quad i=1\ldots n \qquad (4\text{-}3)$$

and write the cross product of two vectors $u=[u_1 \; u_2 \; u_3]^T$ and v in matrix notation as $$u \times v = u^x v = \begin{bmatrix} 0 & -u_3 & u_2 \\ u_3 & 0 & -u_1 \\ -u_2 & u_1 & 0 \end{bmatrix} v \qquad (4\text{-}4)$$

then (4-1) becomes:

$$\dot{\beta}_i I_i + \beta_i \dot{I}_i = \dot{p}_{CT} - q_i^x w_{CT}, \quad i=1\ldots n \qquad (4\text{-}5)$$

As before, we delete the term $\dot{p}_{CT}$ by substracting the $n^{th}$ equation of (4-5) from the rest and get:

$$\dot{\beta}_i I_i - \dot{\beta}_n I_n + \beta_i \dot{I}_i - \beta_n \dot{I}_n = (q_i - q_n)^x w_{CT}, \quad i=1\ldots (n-1) \qquad (4\text{-}6)$$

Re-arranging terms, we can write (4-6) as:

$$\begin{bmatrix} R_x & P_x \\ R_y & P_y \\ R_z & P_z \end{bmatrix} \begin{bmatrix} \dot{\beta} \\ w_{CT} \end{bmatrix} = \begin{bmatrix} 0 \\ h_1 \\ h_2 \end{bmatrix} \qquad (4\text{-}7)$$

where $$\dot{\beta} := [\dot{\beta}_1 \ldots \dot{\beta}_n]^T \qquad (4\text{-}8)$$

and the matrices $R_x$, $R_y$ and $R_z$ are defined as in (3-7). $P_x$, $P_y$ and $P_z$ are $(n-1) \times 3$ matrices given by;

$$P_x := \begin{bmatrix} \cdot & \cdot & \cdot \\ 0 & -(q_{jz} - q_{nz}) & (q_{jy} - q_{ny}) \\ \cdot & (j=1\ldots n-1) & \cdot \end{bmatrix} \qquad (4\text{-}9a)$$

$$P_y := \begin{bmatrix} \cdot & \cdot & \cdot \\ (q_{jz} - q_{nz}) & 0 & -(q_{jx} - q_{nx}) \\ \cdot & (j=1\ldots n-1) & \cdot \end{bmatrix} \qquad (4\text{-}9b)$$

$$P_z := \begin{bmatrix} \cdot & \cdot & \cdot \\ -(q_{jy} - q_{ny}) & (q_{jx} - q_{nx}) & 0 \\ \cdot & (j=1\ldots n-1) & \cdot \end{bmatrix} \qquad (4\text{-}9c)$$

$q_{ix}$, $q_{iy}$ and $q_{iz}$ being the components of $q_i$ defined in (4-3). $h_1$ and $h_2$ are $(n-1)$-vectors given by;

$$h_1 := \begin{bmatrix} \beta_n \dot{y}_n - \beta_y \dot{y}_j \\ (j=1\ldots n-1) \end{bmatrix}; \qquad (4\text{-}10)$$

$$h_2 := \begin{bmatrix} \beta_n \dot{z}_n - \beta_j \dot{z}_j \\ (j=1\ldots n-1) \end{bmatrix}$$

A general solution to (4-7) is then given by;

$$\begin{bmatrix} \dot{\beta} \\ w_{CT} \end{bmatrix} = \begin{bmatrix} R_x & P_x \\ R_y & P_y \\ R_z & P_z \end{bmatrix}^+ \begin{bmatrix} 0 \\ h_1 \\ h_2 \end{bmatrix} \qquad (4\text{-}11)$$

providing the pseudoinverse exists.

Once $\beta_i$ and $w_{CT}$ have been computed from (4-11), the linear velocity $P_{CT}$ follows directly from averaging the equations in (4-5):

$$\dot{p}_{CT} = (1/n) \sum_{i=1}^{n} (\dot{\beta}_i I_i + \beta_i \dot{I}_i - w_{CT} \times A_{CT} p_i) \quad (4\text{-}15)$$

and the photogrammetry solution is complete.

TARGET MOTION ESTIMATION AND TRACKING CONTROL ALGORITHM

The following is a description of the algorithms for (B) target motion estimation and (C) tracking control.

Notation

Figure 11:
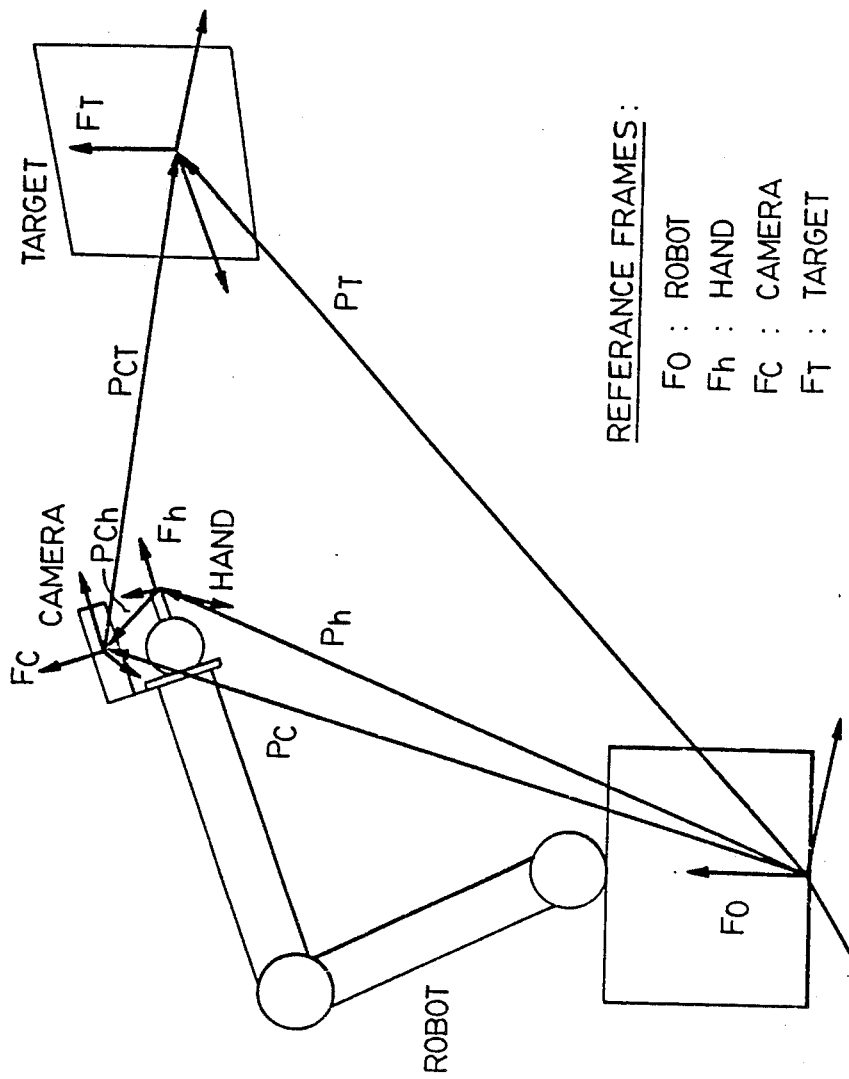

The letter p is used generally to denote a position vector. The letter B is the orientation matrix of one frame of reference expressed in terms of another frame of reference. The letters w and $\dot{p}$ represent the angular and linear velocity, respectively, of one frame of reference in terms of another. The various reference frames and position vectors are described in FIG. 11.

We define the following for both the target motion estimation and the tracking control algorithms.

$p_h$, $B_{Oh}$: position and orientation of robot's hand w.r.t. its base.

$\dot{p}_h$, $w_h$: linear and angular velocities of robot's hand w.r.t. base.

$p_T$, $B_{OT}$: estimated position and orientation of target w.r.t. robot's base.

$\dot{p}_T$, $w_T$: estimated linear and angular velocities of target w.r.t. base.

$p_C$, $B_{OC}$: position and orientation of camera w.r.t. robot's base.

$\dot{p}_C$, $w_C$: linear and angular velocities of camera w.r.t. base.

$p_{Ch}$, $B_{Ch}$: position and orientation of camera on robot's hand (assumed fixed).

$p_{CT}$, $B_{CT}$: estimated position and orientation of target w.r.t. camera.

$\dot{p}_{CT}$, $w_{CT}$: estimated linear and angular velocities of target w.r.t. camera.

$\dot{p}_{CT}^*$, $\dot{w}_{CT}^*$:

commanded (from hand controller) velocities of target relative to camera.

$\dot{p}_h^*$, $\dot{w}_h^*$:

commanded outputs to the resolved-rate controller of the robot.

For any vector v with components [x, y, z], define the matrix $$v^x = \begin{bmatrix} 0 & -z & y \\ z & 0 & -x \\ -y & x & 0 \end{bmatrix}$$

(B) Target Motion Estimation Algorithm

The photogrammetry algorithm yields the parameters: ($p_{CT}$, $B_{CT}$, $\dot{p}_{CT}$, $w_{CT}$) and the instantaneous values of ($p_h$, $B_{Oh}$, $\dot{p}_h$, $w_h$) are obtained from the robot's kinematic transformation model. From the latter, together with ($p_{hC}$, $B_{hC}$) which describe the camera's position and orientation on the robot, we can calculate ($p_C$, $B_{OC}$). With this information, we can compute the following estimates of the target's motion:

$$p_T = p_C + B_{OC} \, p_{CT}$$

$$B_{OT} = B_{Oh} \, B_{hC} \, B_{CT}$$

$$\dot{p}_T = \dot{p}_h + w_h^x (p_T - p_h) + B_{Oh} \, B_{hC} \, \dot{p}_{CT}$$

$$w_T = w_h + B_{Oh} \, B_{hC} \, w_{CT}$$

(C) Tracking Control Algorithm

The commands for the resolved-rate controller of the robot are generated by the following equations:

$$\begin{bmatrix} \dot{w}_h^* \\ \dot{p}_h^* \end{bmatrix} = E_1 \begin{bmatrix} w_T \\ \dot{p}_T \end{bmatrix} - E_2 \begin{bmatrix} v_w \\ v_v \end{bmatrix}$$

where $$E_1 = \begin{bmatrix} I & 0 \\ (p_T - p_h)x & I \end{bmatrix}$$

$$E_2 = \begin{bmatrix} B_{OC} & 0 \\ (p_T - p_H)x B_{OC} & B_{OC} \end{bmatrix}$$

$$v_v = \dot{p}_{CT}^* - F(p_{CT} - p_{CT}^*)$$

where I is a unit matrix and F is a positive-definite matrix.

$p_{CT}^*$, the desired target position relative to the camera, is obtained by integrating the commanded rate $\dot{p}_{CT}^*$.

The signal $v_w$ is computed as follows:

$$v_w = w^*_{CT} - K(\bar{n}_{CT} q_{CT} - n_{CT} \bar{q}_{CT} - q^{-x}_{CT} q_{CT})$$

where K is a positive-definite matrix and ($n_{CT}$, $q_{CT}$, $\bar{n}_{CT}$, $\bar{q}_{CT}$) are Euler parameters generated by integrating the following equations:

$$2\dot{n}_{CT} = -q^T_{CT} w_{CT};\ 2\dot{q}_{CT} = (n_{CT} I + q^x_{CT}) w_{CT}$$

$$2\dot{\bar{n}}_{CT} = -q^T w^*_{CT};\ 2\dot{\bar{q}}_{CT} = (\bar{n}_{CT} I + q^x_{CT}) w^*_{CT}$$

where a superscript "T" denotes matrix or vector transpose and I is a unit matrix.

IMPLEMENTATION ASPECTS

Figure 1:
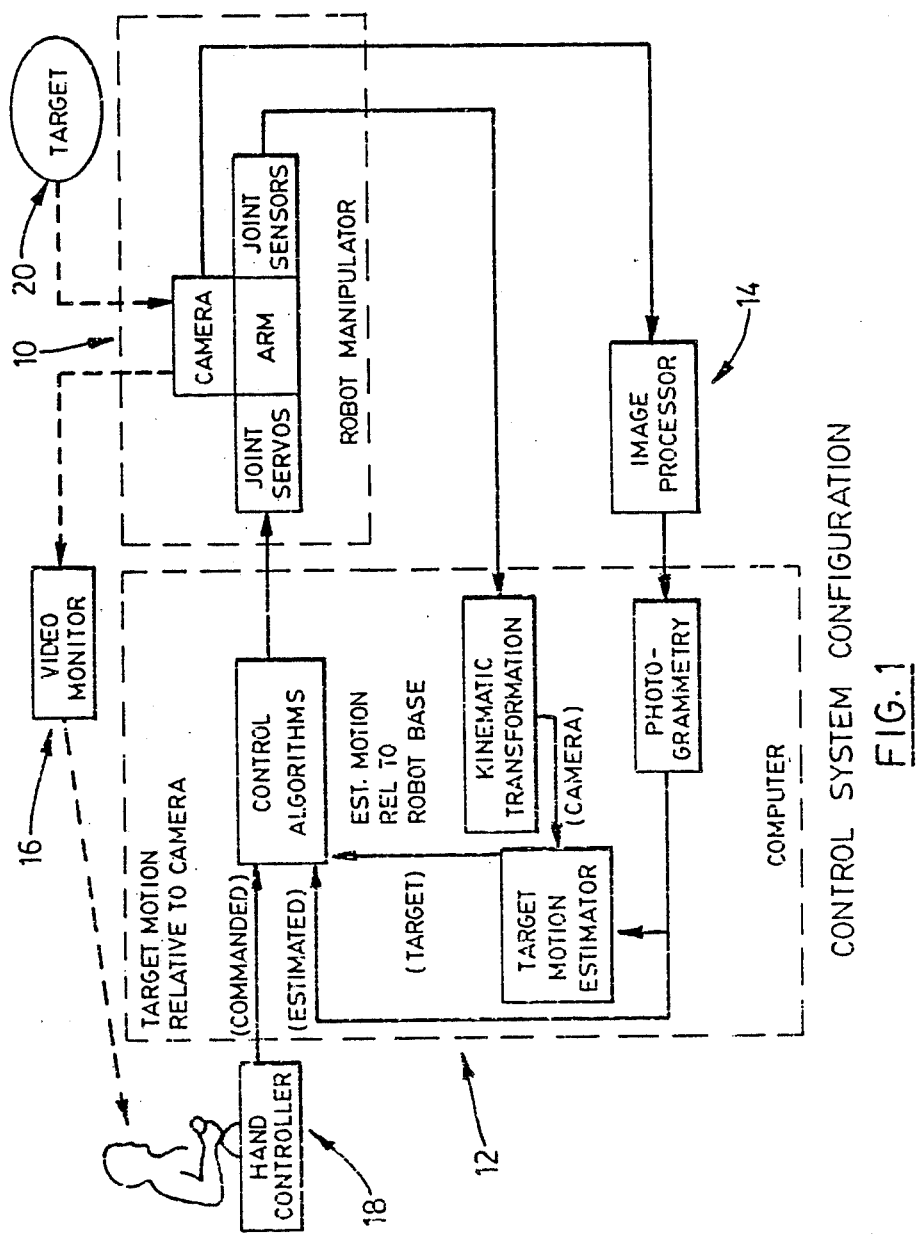
Figure 2:
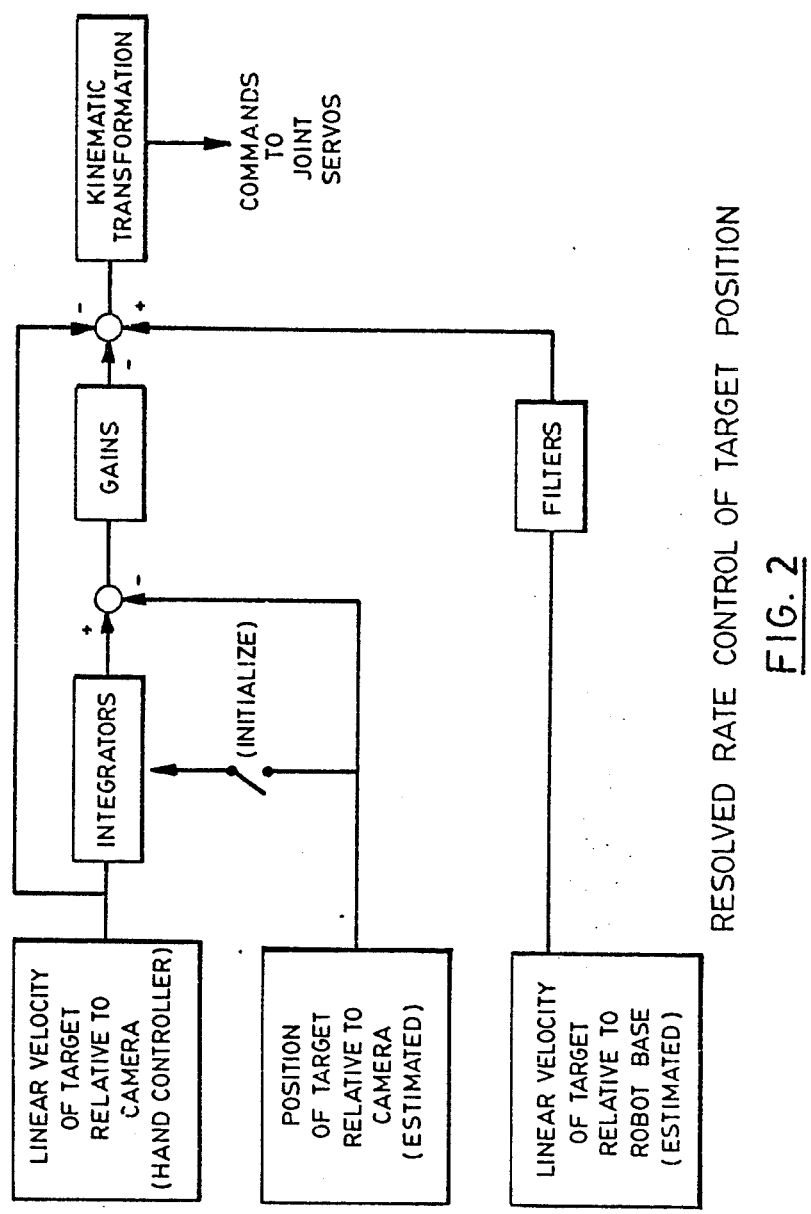
Figure 3:
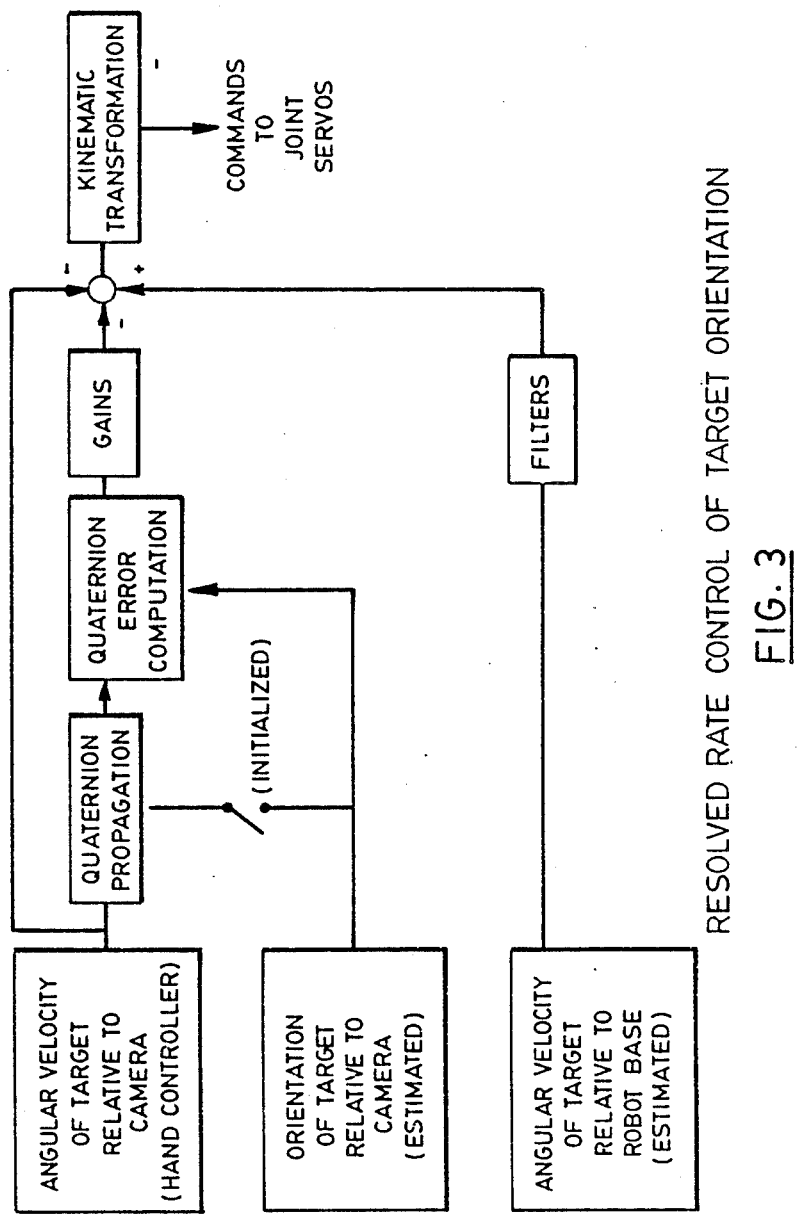
Figure 4:
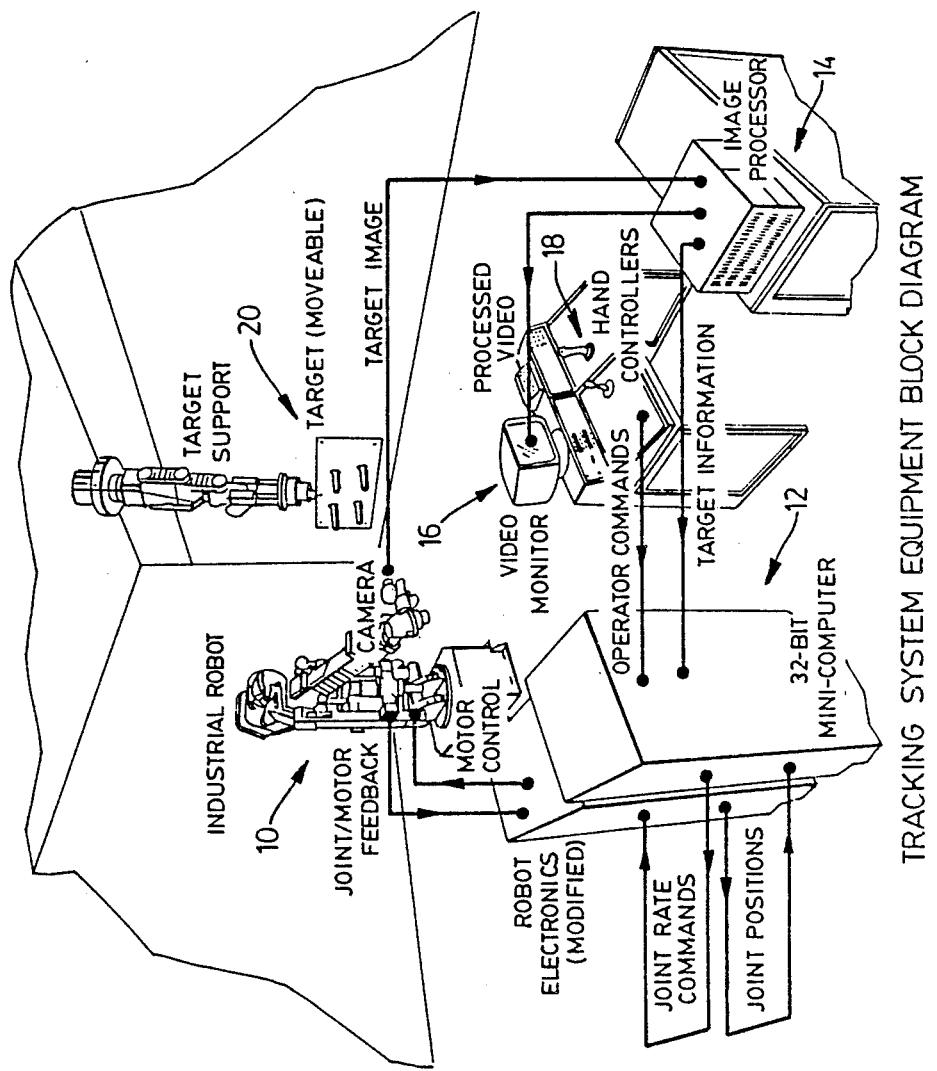

FIG. 4 illustrates the equipment that comprises an operating laboratory demonstration of the system. Included are an industrial robot, a 32-bit minicomputer, an image processor, a moveable target and a video camera. The features of each piece of equipment will be discussed below followed by a description of the software used to implement the tracking.

Industrial Robot

Figure 5:
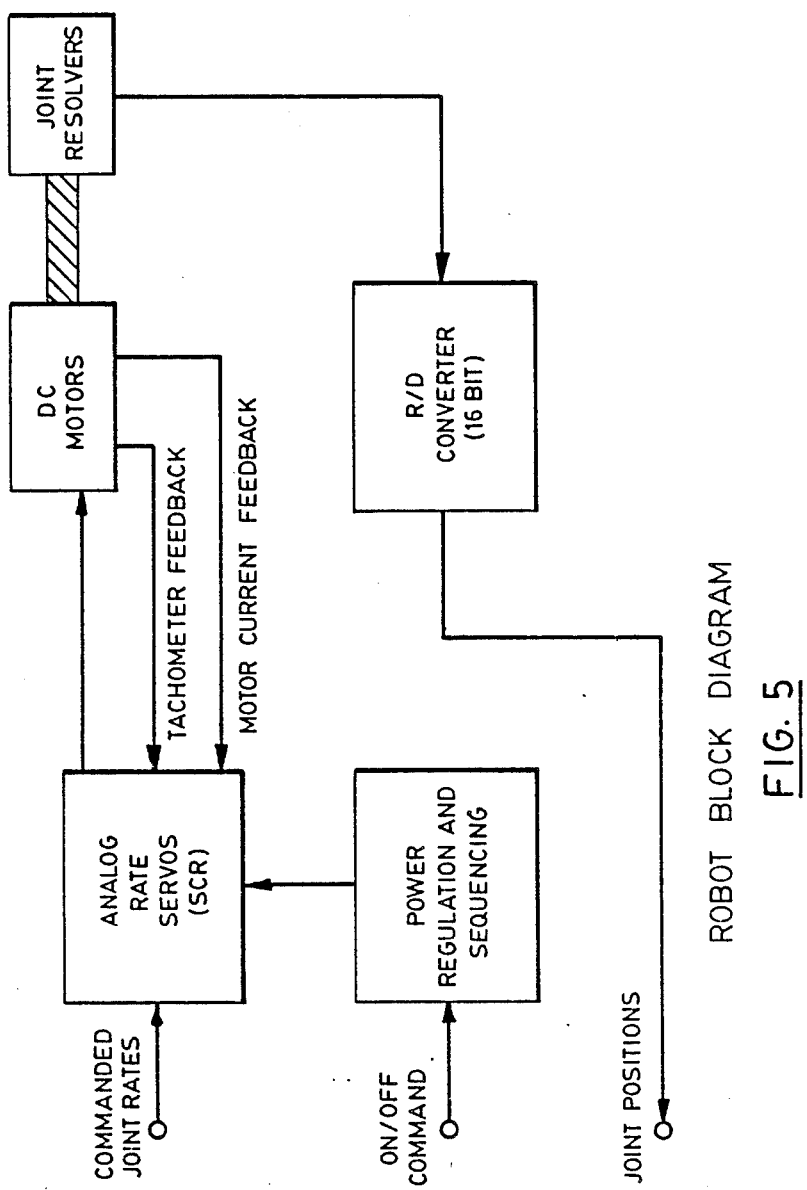

The robot is an industrial electric robot (Cincinnati Milacron T3-776) with a payload capacity of 70 kg (suitable for carrying a camera, sensors and a reasonably sized tool or other object). For use in the laboratory as a test bed for developing and evaluating control algorithms, the robot's microprocessor based control computer was replaced with an interface to the I/O subsystem of a 32-bit minicomputer. The use of the minicomputer allows rapid prototyping and debugging of control software and provides enough computing power to execute sophisticated control algorithms programmed in high level languages. The original analog rate servos for joint control and the sensors (resolvers) for joint position measurement were used without modification in the minicomputer based control system. FIG. 5 shows a block diagram of the robot after the modifications to the robot electronics were made.

Minicomputer

Figure 6:
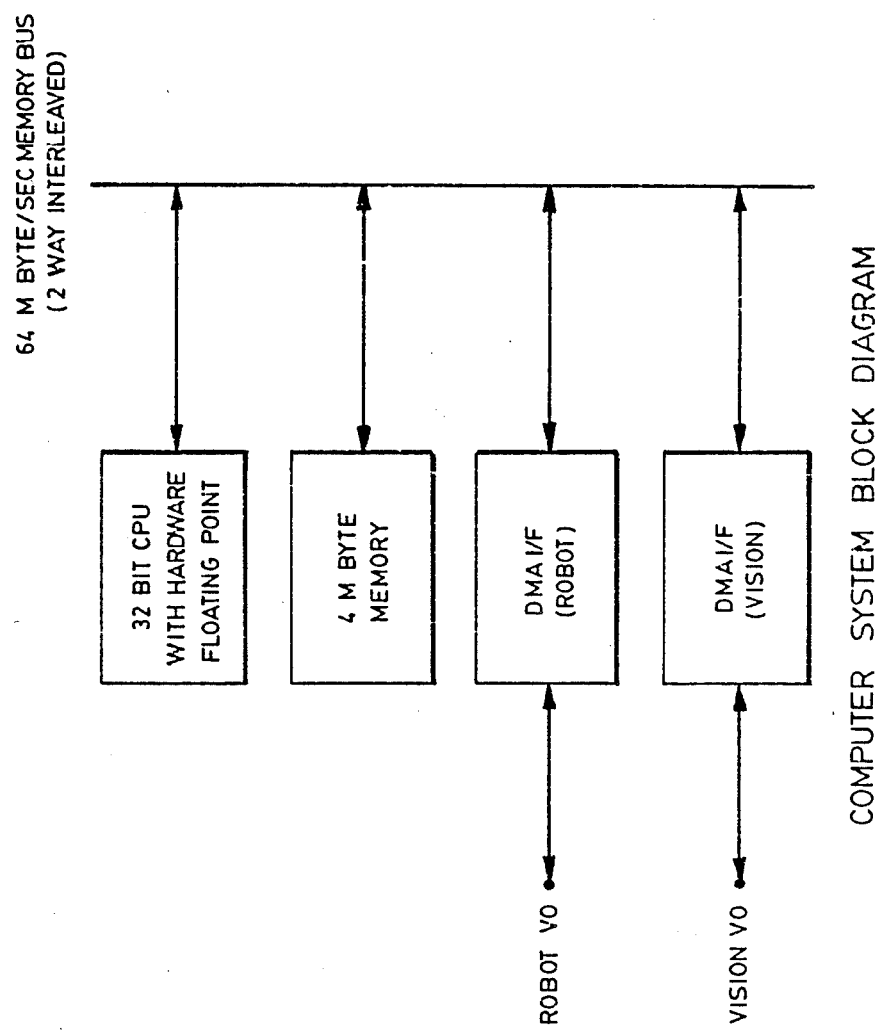

The computer used is a high performance super-mini (Perkin-Elmer 3250XP) running a real-time operating system (OS/32) suitable for both development and run-time operation. The system features a high bandwidth (64 mb/sec) memory bus capable of supporting the CPU and I/O subsystem simultaneously without performance degradation. This is important when I/O from several devices (vision system and robot interface) must be accommodated while executing software with cycle times of less than 50 ms. The features of the computer system that are important to the tracking application are shown in FIG. 6.

Vision System

Figure 7:
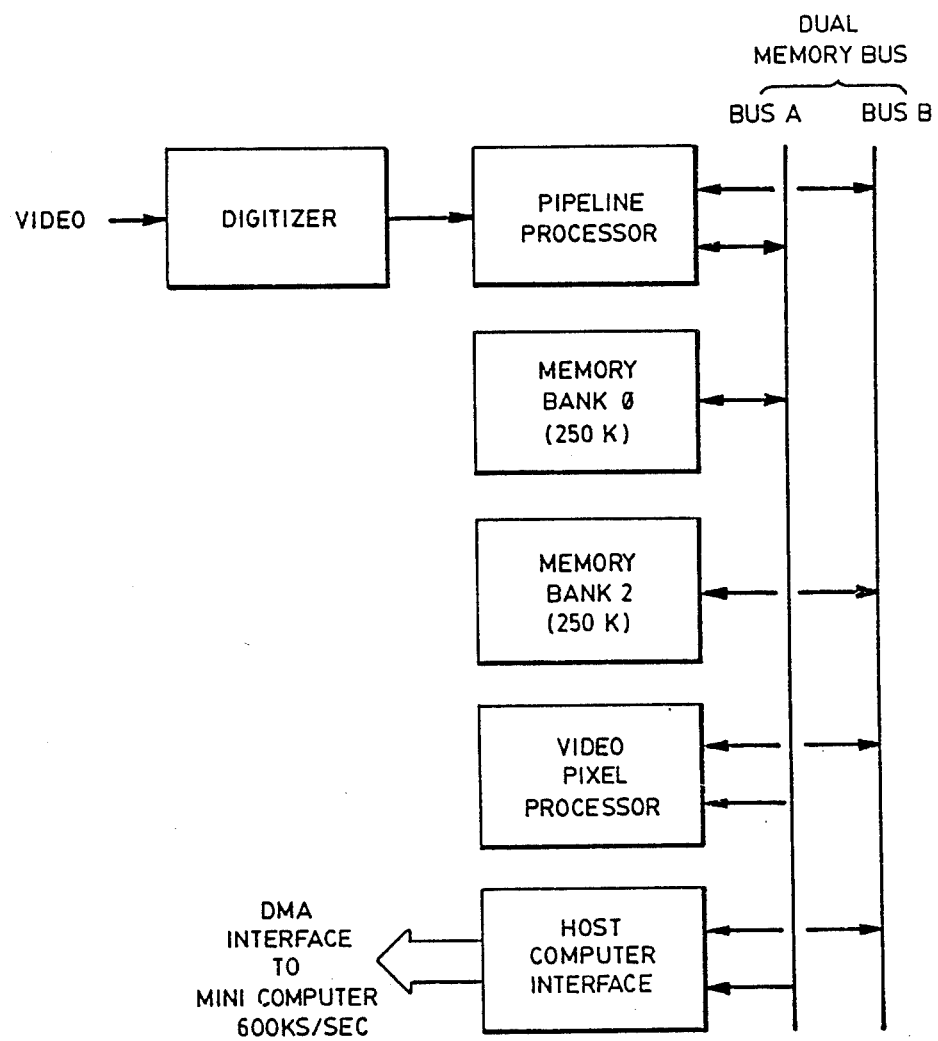

The vision system is based on an image processor (RCI Trapix) capable of acquiring and preprocessing an image on a frame by frame basis. The system has a dual memory bus architecture which is important for its use in the control system for the robot (discussed in the software section). The image processor has two computing elements: a pipeline processor capable of operating on image data as it is being acquired, and a pixel processor capable of preprocessing image data prior to its transfer to a host computer. In the tracking application, the pipeline processor is used only to control synchronization of the image acquisition with the processes running in the minicomputer while the pixel processor is used to calculate information about the targets in the image prior to transfer to the host. The details of the image processor that apply to the tracking demonstration are shown in FIG. 7.

Moveable Target

Figure 8:
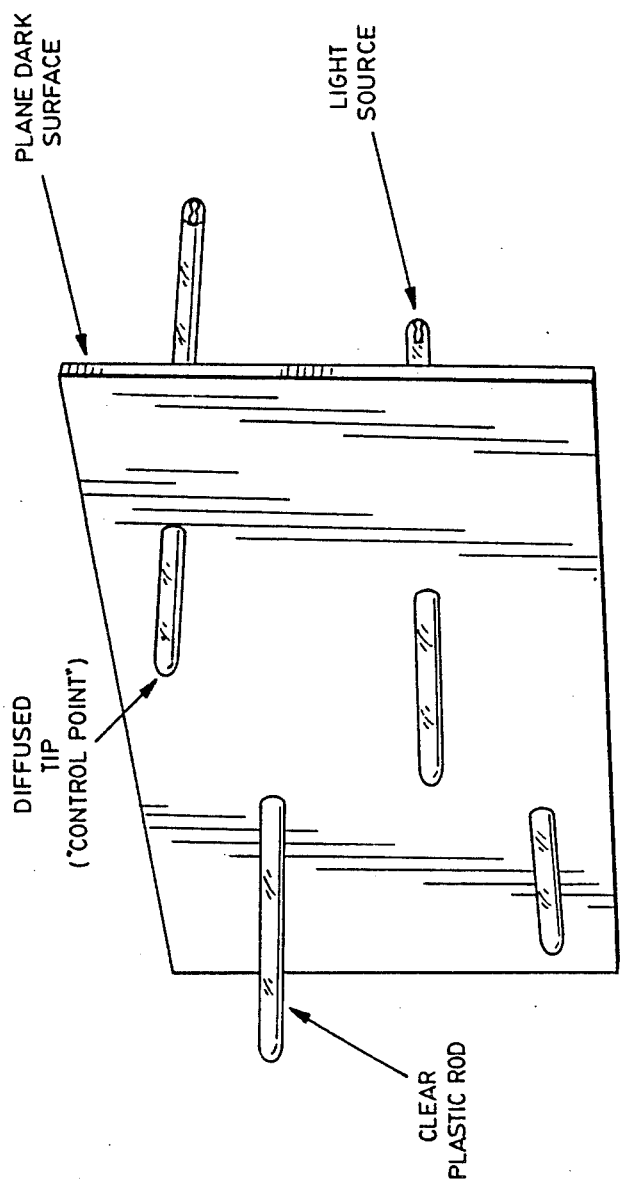

The target shown in FIG. 8 was fabricated to allow ease of configuration of the control points required for the photogrammetry. The control points are taken to be the tips of illuminated plastic rods which are adjustable in the length. Illumination of the rods is selected via switches on the operator console.

Video Camera

The video camera contains a Charge Coupled Device (CCD) sensor. Output from the camera is standard video used by the image processor without preprocessing.

Software

Figure 9:
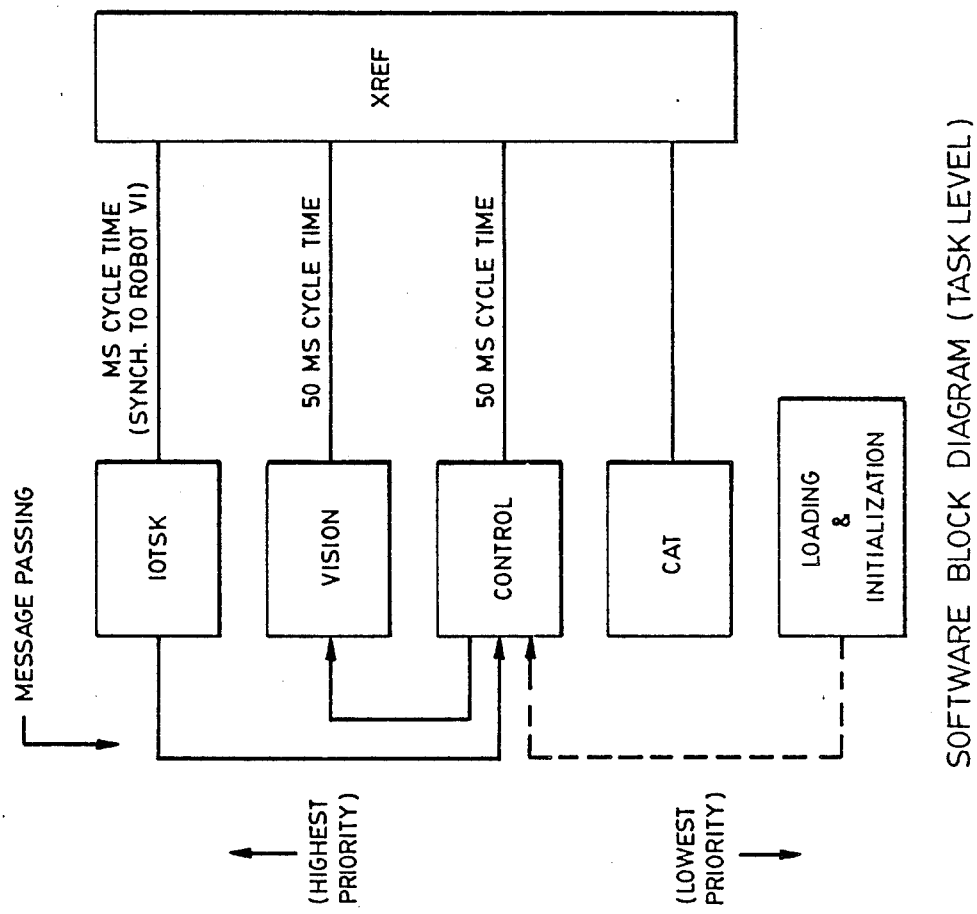

The software in the minicomputer that implements the target tracking is broken into three main tasks (Ref: FIG. 9). An IOTSK provides data acquisition and low level control of the joint rate servos in the robot. A VISION task maintains synchronization with the activities in the image processor and looks after capture and tracking of the individual control points (up to four). A CONTROL task is responsible for executing the control algorithms and the photogrammetry as well as supervising overall operation of the robot control system.

The photogrammetry requires an accurate determination of the position of the control points in the image. This is accomplished by establishing "windows" around the control points and calculating the centroids of the part of the image within the windows. The position of the windows is adjusted each control cycle in order to maintain tracking. For reasonable window sizes (e.g., 33×33 pixels) each centroid calculation would take about 10 ms in the super-mini. For multiple control points the overhead required to perform the centroid calculations prevents operation of the control system with the desired 50 ms cycle time. For this reason, software was developed to allow carrying out the required computations in the image processor's pixel processor. This frees the minicomputer for more demanding calculations such as those that comprise the photogrammetry and kinematics.

The dual memory bus architecture of the image processor is essential for operation of the real-time tracking system. Since acquisition of a frame of video data takes a relatively long time (33 ms), it is important that the data obtained in a previous cycle can be processed without suspending the image digitization operation. This is accomplished by making use of the independent memory channels in the Trapix which allows concurrent image acquisition by the pipeline processor and processing by the pixel processor.

Approximate timing for the tracking demonstration is summarized as follows (expressed as % of the 50 ms cycle):

| Function | Mini Computer | Image Processor |
| --- | --- | --- |
| Servo control | 20% | — |
| Control laws | 10% | — |
| Photogrammetry | 20% | — |
| Centroid calc. (4 control pts) | — | 80% |

It should be noted that functions in the minicomputer and the image processor are carried out concurrently.

Experimental Results

Since the moveable target is not instrumented a quantitative evaluation of the tracking was not possible. In order to get an estimate of tracking performance however, the target was independently moved through all six degrees of freedom while an observer watched the video monitor displaying the camera image. The motion of the target that was most demanding on the tracking system performance was found to be pure yaw (rotation about its vertical axis). In a typical situation of this type (T3 about 2 meters from target, target rotating at 5°/sec) the deviation in yaw of the target with respect to the robot end points was a maximum of 5°. This is with the feedback gains adjusted to provide well-damped transient response. In all other translational and rotational combinations tracking was much closer.

With this level of performance the system is certainly useable for operations, like close range grappling of a moving target.

The concept of robotically-assisted teleoperation is a significant one insofar as the future role of teleoperation is concerned. Using only commercially available equipment, we have demonstrated here a method of vision-aided remote handling of objects in motion. This autonomous capability will have immediate applications in the repair and servicing of satellites in space as well as in terrestrial applications such as the manipulation of work pieces on moving conveyors.

We claim:

1. A telerobotic system adapted for handling a moving objects, said object having at least three points of known position, comprising:
   (a) a robot manipulator comprising
      (i) a movable robotic arm having an effector for handling an object,
      (ii) means for moving said arm in response to arm input signals,
      (iii) means for sensing the position of said arm and for generating arm output signals, which arm output signals characterize the dynamic motion behaviour of said arm, and
      (iv) a video camera carried by said arm, said camera being adapted to respond in real time to real time motion of said moving object within the field of view of said camera;
   (b) a video monitor for receiving an input video signal from said video camera and for displaying an image of the object to a human operator;
   (c) image processing means, responsive to the output signal of said camera, for acquiring and pre-processing an image of the object on a frame by frame basis;
   (d) hand control means for generating a hand control output signal in response to input from a human operator;
   (e) computer means for generating arm input signals disposed between said hand control means, said robot manipulator, and said image processing means, said computer means receiving (i) output signals from said image processing means and (ii) said arm output signals and (iii) said hand control output signal and generating arm input signals in response to said received signals whereby said arm tracks the real time motion of the object.

2. A telerobotic system as claimed in claim 1 wherein said computer means comprising means for solving the following tracking control algorithm $$\begin{bmatrix} w_h^* \\ \dot{p}_h^* \end{bmatrix} = E_1 \begin{bmatrix} w_T \\ \dot{p}_T \end{bmatrix} - E_2 \begin{bmatrix} v_w \\ v_v \end{bmatrix}$$

where:

$$E_1 = \begin{bmatrix} I & 0 \\ (p_T - p_h)^x I \end{bmatrix};$$

$$E_2 = \begin{bmatrix} B_{OC} & 0 \\ (p_T - p_h)^x B_{OC} & B_{OC} \end{bmatrix};$$

$$v_v = \dot{p}_{CT}^* - F(p_{CT} - p_{CT}^*); \text{ and}$$

wherein I is a unit matrix, F is a positive-definite matrix; and $P_{CT}$, the desired target position relative to the camera, is obtained by integrating the commanded rate $\dot{P}_{CT}$; and wherein the signal $v_w$ is computed as follows:

$$v_w = w_{CT}^* - K(\bar{n}_{CT}q_{CT} - n_{CT}\bar{q}_{CT} - \bar{q}_{CT}^{-x}q_{CT})$$

where K is a positive-definite matrix and ($n_{CT}$, $q_{CT}$, $\bar{n}_{CT}$, $\bar{q}_{CT}$) are Euler parameters generated by integrating the following equations:

$$2\dot{n}_{CT} = -q_{CT}^T w_{CT}; \quad 2\dot{q}_{CT} = (n_{CT}^I + q_{CT}^x)w_{CT}$$

$$2\dot{\bar{n}}_{CT} = -q^T w_{CT}^*; \quad 2\dot{q}_{CT} = (\bar{n}_{CT}^I + q_{CT}^{\bar{x}})w_{CT}^*$$

wherein a superscript "T" denotes matrix or vector transport and I is a unit matrix; and wherein:
the letter p is used generally to denote a position vector; and
the letter B denotes the orientation matrix of one frame of reference expressed in terms of another frame of reference; and
the letters w and p represent the angular and linear velocity, respectively, of one frame of reference in terms of another frame of references, wherein:
$p_h$, $B_{Oh}$ denote position and orientation of the robot's hand with respect to its base;
$\dot{p}_h$, $w_h$ denote linear and angular velocities of the robot's hand with respect to its base;
$p_T$, $B_{Ot}$ denote estimated position and orientation of a target with respect to the base of the robot;
$\dot{p}_T$, $w_T$ denote estimated linear and angular velocities of a target with respect to the base of the robot;
$p_C$, $B_{OC}$ denote position and orientation of said camera with respect to the base of the robot;
$\dot{p}_C w_C$ denote linear and angular velocities of said camera with respect to base of the robot;
$p_{Ch}$, $B_{Ch}$ denote position and orientation of said camera on the robot's hand (assumed to be fixed);
$p_{CT}$, $B_{CT}$ denote estimated position and orientation of a target with respect to said camera;
$\dot{P}_{CT}$, $w_{CT}$ denote estimated linear and angular velocities of a target with respect to said camera;

$$\dot{p}_{CT}^*, \dot{w}_{CT}^*$$

denote commanded (from hand controller) velocities of target relative to said camera, $$\dot{p}_h^*, \dot{w}_h^*$$

denote commanded outputs to the resolved-rate controller of said robot; and
for any vector v with components define the matrix $$v^x = \begin{bmatrix} 0 & -z & y \\ z & 0 & -x \\ -y & x & 0 \end{bmatrix}$$

3. A telerobotic system as claimed in claim 1 wherein said computer means comprises means for solving the following photogrammetry algorithm comprising the steps of:
   (a) constructing matrix P from the control point coordinates $p_i$, determining matrices E and $P_1$, using Gaussian elimination, and computing the psuedoinverse and kernel of $P_1$;
   (b) calculating matrices $R_{xi}$, $R_{yi}$, $R_{zi}$ (i=1,2);
   (c) finding the kernel of $R_2$;
   (d) constructing matrices $V_i$, (i=1, ... 3);
   (e) selecting an initial estimate of vector $x_k$ (k=0);
   (f) evaluating function f at the current iterative point $x_k$ and determining the norm of f;
   (g) comparing the norm of f with a predefined threshold of zero;
   (h) if the norm of f is within a predefined threshold of zero, computing vectors $\alpha$ and $\beta$, assembling $B_{CT}$ and recovering $p_{CT}$;
   (i) if the norm of f is outside a predefined threshold of zero, computing the Jacobian $\nabla f$ and updating $x_k$, and returning to step (f) above;
   (j) if $\nabla f$ cannot be computed because of a singularity, returning to step (f) with an arbitrarily perturbed iterative point $x_{k+1}$.

4. A telerobotic system as claimed in claim 3 wherein said computer means comprising means for solving the following tracking control algorithm $$\begin{bmatrix} w_h^* \\ \dot{p}_h^* \end{bmatrix} = E_1 \begin{bmatrix} w_T \\ \dot{p}_T \end{bmatrix} - E_2 \begin{bmatrix} v_w \\ v_v \end{bmatrix}$$

where:

$$E_1 = \begin{bmatrix} I & 0 \\ (p_T - p_h)^x I \end{bmatrix};$$

$$E_2 = \begin{bmatrix} B_{OC} & 0 \\ (p_T - p_h)^x B_{OC} & B_{OC} \end{bmatrix};$$

$$v_v = \dot{p}_{CT}^* - F(p_{CT} - p_{CT}^*); \text{ and}$$

where I is a unit matrix, F is a positive-definite matrix; and $$p_{CT}^*,$$

the desired target position relative to the camera, is obtained by integrating the commanded rate $$\dot{p}_{CT}^*;$$

and wherein the signal $v_w$ is computed as follows:

$$v_w = w_{CT}^* - K(\bar{n}_{CT} q_{CT} - n_{CT} \bar{q}_{Ct} - q_{CT}^{-x} q_{CT})$$

where K is a positive-definite matrix and ($n_{CT}$, $q_{CT}$, $\bar{n}_{Ct}$, $\bar{q}_{CT}$) are Euler parameters generated by integrating the following equations:

$$2\dot{n}_{CT} = -q_{CT}^T w_{CT}; \quad 2\dot{q}_{CT} = (n_{CT}^I + q_{CT}^x) w_{CT}$$

$$2\dot{\bar{n}}_{CT} = -\bar{q}^T w_{CT}^*; \quad 2\dot{\bar{q}}_{CT} = (\bar{n}_{CT}^I + \bar{q}_{CT}^x) w_{CT}^*$$

where a superscript "T" denotes matrix or vector transpose and I is a unit matrix; and
wherein:
   the letter p is used generally to denote a position vector; and
   the letter B denotes the orientation matrix of one frame of reference expressed in terms of another frame of reference; and
   the letters w and p represent the angular and linear velocity, respectively, of one frame of reference in terms of another frame of references, wherein:
   $p_h$, $B_{Oh}$ denote position and orientation of the robot's hand with respect to its base;
   $\dot{p}_h$, $w_h$ denote linear and angular velocities of the robot's hand with respect to its base;
   $p_T$, $B_{OT}$ denote estimated position and orientation of a target with respect to the base of the robot;
   $\dot{P}_T$, $w_T$ denote estimated linear and angular velocities of a target with respect to the base of the robot;
   $p_C$, $B_{OC}$ denote position and orientation of said camera with respect to the base of the robot;
   $\dot{p}_C$, $w_C$ denote linear and angular velocities of said camera with respect to base of the robot;
   $p_{Ch}$, $B_{Ch}$ denote position and orientation of said camera on the robot's hand (assumed to be fixed);
   $p_{CT}$, $B_{CT}$ denote estimated position and orientation of a target with respect to said camera;
   $\dot{p}_{CT}$, $w_{CT}$ denote estimated linear and angular velocities of a target with respect to said camera;

$$\dot{p}_{CT}^*, \dot{w}_{CT}^*$$

denote commanded (from hand controller) velocities of target relative to said camera, $$\dot{p}_h^*, \dot{w}_h^*$$

denote commanded outputs to the resolved-rate controller of said robot; and
for any vector v with components, define the matrix $$v^x = \begin{bmatrix} 0 & -z & y \\ z & 0 & -x \\ -y & x & 0 \end{bmatrix}.$$

5. The telerobotic system of claim 1 wherein said computer means comprises;
   (a) computer kinematic transformation means for generating an output signal indicative of the position and orientation of said camera relative to said robot manipulator in response to said arm output signals;
   (b) computer photogrammetry means responsive to the output signal from said image processing means for generating an output signal indicative of the motion characteristics of said moving object relative to said camera, the moving object being within the field of view of said camera;
   (c) target motion estimation means for receiving the output signal from said kinematic transformation means and said computer photogrammetry means and for producing an estimate of the motion characteristics of said moving object relative to said robot manipulator;
(d) control algorithm means which receive the output signals from said computer photogrammetry means, said target motion estimator means and said hand control means and for producing arm input signals for said means for moving said arm in response to such signals.

6. A telerobotic tracking system for tracking the movement of a moving object, said object having at least three points of known position, comprising:
(a) a robot manipulator comprising
  (i) a movable robotic arm,
  (ii) means for moving said arm in response to arm input signals,
  (iii) means for sensing the position of said arm and for generating arm output signals, which arm output signals characterize the dynamic motion behaviour of said arm, and
  (iv) a video camera carried by said arm, said camera being adapted to respond in real time to real time motion of said moving object within the field of view of said camera;
(b) a video monitor which receives an input video signal from said video camera, for displaying an image to a human operator;
(c) image processing means, responsive to the output signal of said camera, capable of acquiring and pre-processing an image on a frame by frame basis;
(d) computer means for receiving (i) the output signal from said image processing means and (ii) said arm output signals and generating arm input signals in response to said input signals to said computer means.

7. A telerobotic system as claimed in claim 6 wherein said computer means comprising means for solving the following tracking control algorithm $$\begin{bmatrix} w_h^* \\ \dot{p}_h^* \end{bmatrix} = E_1 \begin{bmatrix} w_T \\ \dot{p}_T \end{bmatrix} - E_2 \begin{bmatrix} v_w \\ v_v \end{bmatrix}$$

where:

$$E_1 = \begin{bmatrix} I & 0 \\ (p_T - p_h)^x I & \end{bmatrix};$$

$$E_2 = \begin{bmatrix} B_{OC} & 0 \\ (p_T - p_h)^x B_{OC} & B_{OC} \end{bmatrix};$$

$v_v = \dot{p}_{CT}^* - F(p_{CT} - p_{CT}^*)$; and
where I is a unit matrix, F is a positive-definite matrix; and $p_{CT}^*$, the desired target position relative to the camera, is obtained by integrating the commanded rate $\dot{p}_{CT}^*$;

and wherein the signal $v_w$ is computed as follows:

$$v_w = w_{CT}^* - K(n_{Ct}q_{Ct} - n_{CT}\bar{q}_{Ct} - q_{Ct}^{-x}q_{CT})$$

where K is a positive-definite matrix and ($n_{CT}$, $q_{CT}$, $\bar{n}_{Ct}$, $\bar{Q}_{CT}$) are Euler parameters generated by integrating the following equations.

$$2\dot{n}_{CT} = -q_{CT}^T w_{CT}; \quad 2\dot{q}_{CT} = (n_{CT}^I + q_{CT}^x)w_{CT}$$

$$2\dot{\bar{n}}_{CT} = -q^T w_{CT}^*; \quad 2\dot{q}_{CT} = (\bar{n}_{CT}^I + q_{CT}^{-x})w_{CT}^*$$

where a superscript "T" denotes matrix or vector transport and I is a unit matrix; and
wherein:
the letter p is used generally to denote a position vector; and
the letter B denotes the orientation matrix of one frame of reference expressed in terms of another frame of reference; and
the letters w and p represent the angular and linear velocity, respectively, of one frame of reference in terms of another frame of references, wherein:
$p_h$, $B_{Oh}$ denote position and orientation of the robot's hand with respect to its base;
$\dot{p}_h$, $w_h$ denote linear and angular velocities of the robot's hand with respect to its base;
$p_T$, $B_{OT}$ denote estimated position and orientation of a target with respect to the base of the robot;
$\dot{p}_T$, $w_T$ denote estimated linear and angular velocities of a target with respect to the base of the robot;
$p_C$, $B_{OC}$ denote position and orientation of said camera with respect to the base of the robot;
$\dot{p}_C$, $w_C$ denote linear and angular velocities of said camera with respect to base of the robot;
$p_{Ch}$, $B_{Ch}$ denote position and orientation of said camera on the robot's hand (assumed to be fixed);
$p_{CT}$, $B_{CT}$ denote estimated position and orientation of a target with respect to said camera;
$\dot{p}_{CT}$, $w_{CT}$ denote estimated linear and angular velocities of a target with respect to said camera;

$\dot{p}_{CT}^*$, $\dot{w}_{CT}^*$ denote commanded (from hand controller) velocities of target relative to said camera, $\dot{p}_h^*$, $\dot{w}_h^*$ denote commanded outputs to be resolved-rate controller of said robot; and
for any vector v with components, define the matrix $$v^x = \begin{bmatrix} 0 & -z & y \\ z & 0 & -x \\ -y & x & 0 \end{bmatrix}$$

8. A telerobotic system as claimed in claim 6 wherein said computer means comprises means for solving the following photogrammetry algorithm comprising the steps of:
(a) constructing matrix P from the control point coordinates $p_i$, determining matrices E and $P_1$, using Gaussian elimination, and computing the psuedoinverse and kernel of $P_1$;
(b) calculating matrices $R_{xi}$, $R_{yi}$, $R_{zi}$ (i=1,2);
(c) finding the kernel of $R_2$;
(d) constructing matrices $V_i$, (i=1,2);
(e) selecting an initial estimate of vector $x_k$ (k=0);

(f) evaluating function f at the current iterative point $x_k$ and determining the norm of f;

(g) comparing the norm of f with a predefined threshold of zero;

(h) if the norm of f is within a predefined threshold of zero, computing vectors $\alpha$ and $\beta$, assembling $B_{CT}$ and recovering $p_{CT}$;

(i) if the norm of f is outside a predefined threshold of zero, computing the Jacobian $\nabla f$ and updating $x_k$, and returning to step (f) above;

(j) if $\nabla f$ cannot be computed because of a singularity, returning to step (f) with an arbitrarily perturbed iterative point $x_{k+1}$.

9. A telerobotic system as claimed in claim 8 wherein said computer means comprising means for solving the following tracking control algorithm $$\begin{bmatrix} w_h{}^* \\ p_h{}^* \end{bmatrix} = E_1 \begin{bmatrix} wT \\ pT \end{bmatrix} - E_2 \begin{bmatrix} v_w \\ v_v \end{bmatrix}$$

where:

$$E_1 = \begin{bmatrix} I & 0 \\ (p_T - p_h)^x I \end{bmatrix};$$

$$E_2 = \begin{bmatrix} B_{OC} & 0 \\ (p_T - p_h)^x B_{OC} & B_{OC} \end{bmatrix};$$

$$v_v = p_{CT}{}^* - F(p_{CT} - p_{CT}{}^*); \text{ and}$$

where I is a unit matrix, F is a positive-definite matrix; and $p_{CT}{}^*$, the desired target position relative to the camera, is obtained by integrating the commanded rate $p_{CT}{}^*$;

and wherein the signal $v_w$ is computed as follows:

$v_w = w_{CT}{}^* - K(n_{CT} q_{CT} - n_{CT} q_{CT} - q_{CT}{}^{-x} q_{CT})$ where K is a positive-definite matrix and ($n_{CT}$, $q_{CT}$, $\bar{n}_{Ct}$, $\bar{q}_{CT}$) are Euler parameters generated by integrating the following equations:

$2 \dot{n}_{CT} = -q_{CT}^T w_{CT}; \quad 2 \dot{q}_{CT} = (n_{CT}^I + q_{CT}^x) w_{CT}$ $2 \dot{n}_{CT} = -q^T w_{CT}{}^*; \quad 2 \dot{q}_{CT} = (n_{CT}^I + q_{CT}^{-x}) w_{CT}{}^*$ where a superscript "T" denotes matrix or vector transpose and I is a unit matrix; and wherein:

the letter p is used generally to denote a position vector; and the letter B denotes the orientation matrix of one frame of reference expressed in terms of another frame of reference; and the letters w and p represent the angular and linear velocity, respectively, of one frame of reference in terms of another frame of references, wherein:

$p_h$, $B_{Oh}$ denote position and orientation of the robot's hand with respect to its base;

$p_h$, $w_h$ denote linear and annular velocities of the robot's hand with respect to its base;

$p_T$, $B_{OT}$ denote estimated position and orientation of a target with respect to the base of the robot;

$p_T$, $w_T$ denote estimated linear and angular velocities of a target with respect to the base of the robot;

$p_C$, $B_{OC}$ denote position and orientation of said camera with respect to the base of the robot;

$p_C$, $w_C$ denote linear and angular velocities of said camera with respect to base of the robot;

$p_{Ch}$, $B_{Ch}$ denote position and orientation of said camera on the robot's hand (assumed to be fixed);

$p_{CT}$, $B_{Ct}$ denote estimated position and orientation of a target with respect to said camera;

$p_{CT}$, $w_{CT}$ denote estimated linear and angular velocities of a target with respect to said camera;

$p_{CT}{}^*$, $w_{CT}{}^*$ denote commanded (from hand controller) velocities of target relative to said camera, $p_h{}^*$, $w_h{}^*$ denote commanded outputs to the resolved-rate controller of said robot; and for any vector v with components, define the matrix $$v^x = \begin{bmatrix} 0 & -z & y \\ z & 0 & -x \\ -y & x & 0 \end{bmatrix}$$

10. The telerobotic system of claim 6 wherein said computer means comprises:

(a) responsive to said arm output signal from computer kinematic transformations means for generating an output signal indicative of the position and orientation of said camera relative to said robot manipulator;

(b) computer photogrammetry means responsive to the output signal from said image processing means for generating an output signal indicative of the motion characteristics of said moving object relative to said camera, the moving object being within the field of view of said camera;

(c) target motion estimation means for receiving the output signal from said kinematic transformation means and said computer photogrammetry means and for producing an estimate of the motion characteristics of said moving object relative to said robot manipulator;

(d) control algorithm means which receive the output signals from said computer photogrammetry means, said target motion estimator means and for producing arm input signals for said means for moving said arm in response to such signals.

* * * * *